J. M. Krider.
Tailors' Measure.
N° 11866. Patented Oct. 31. 1854
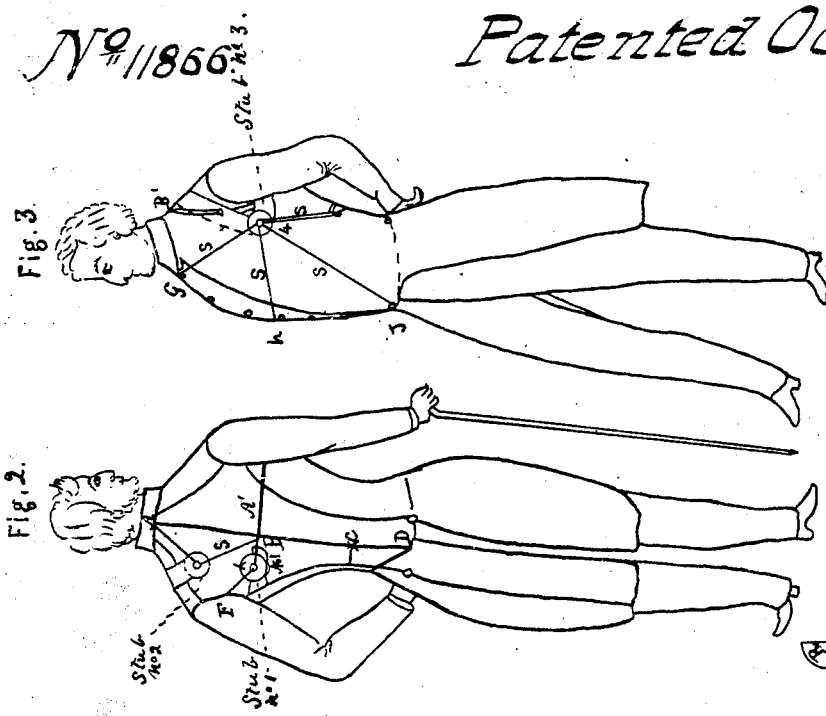
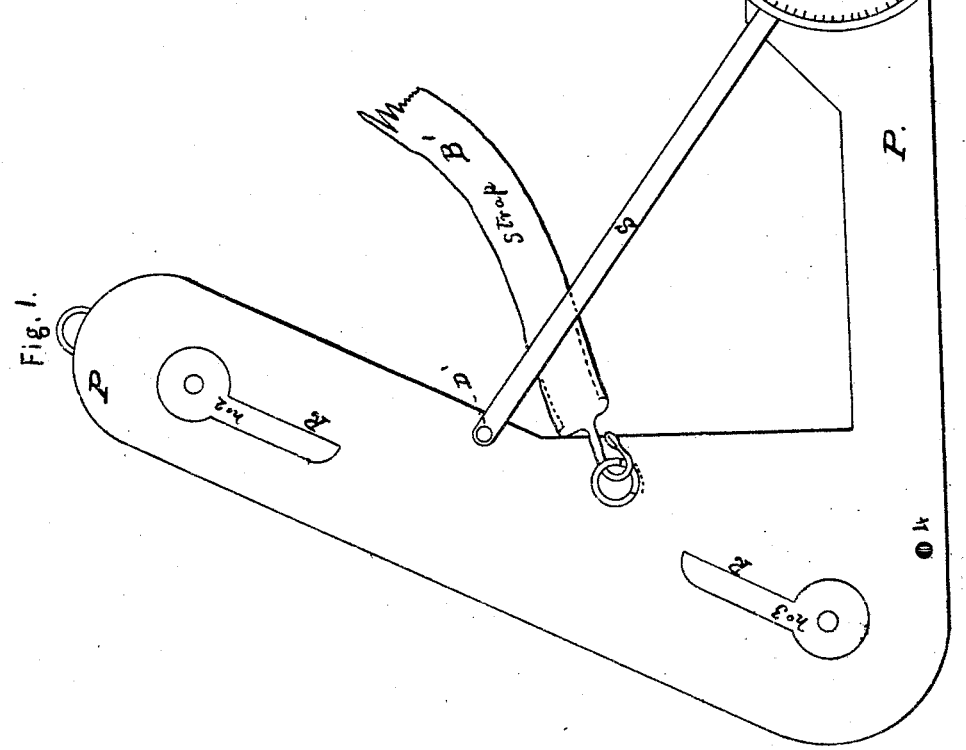

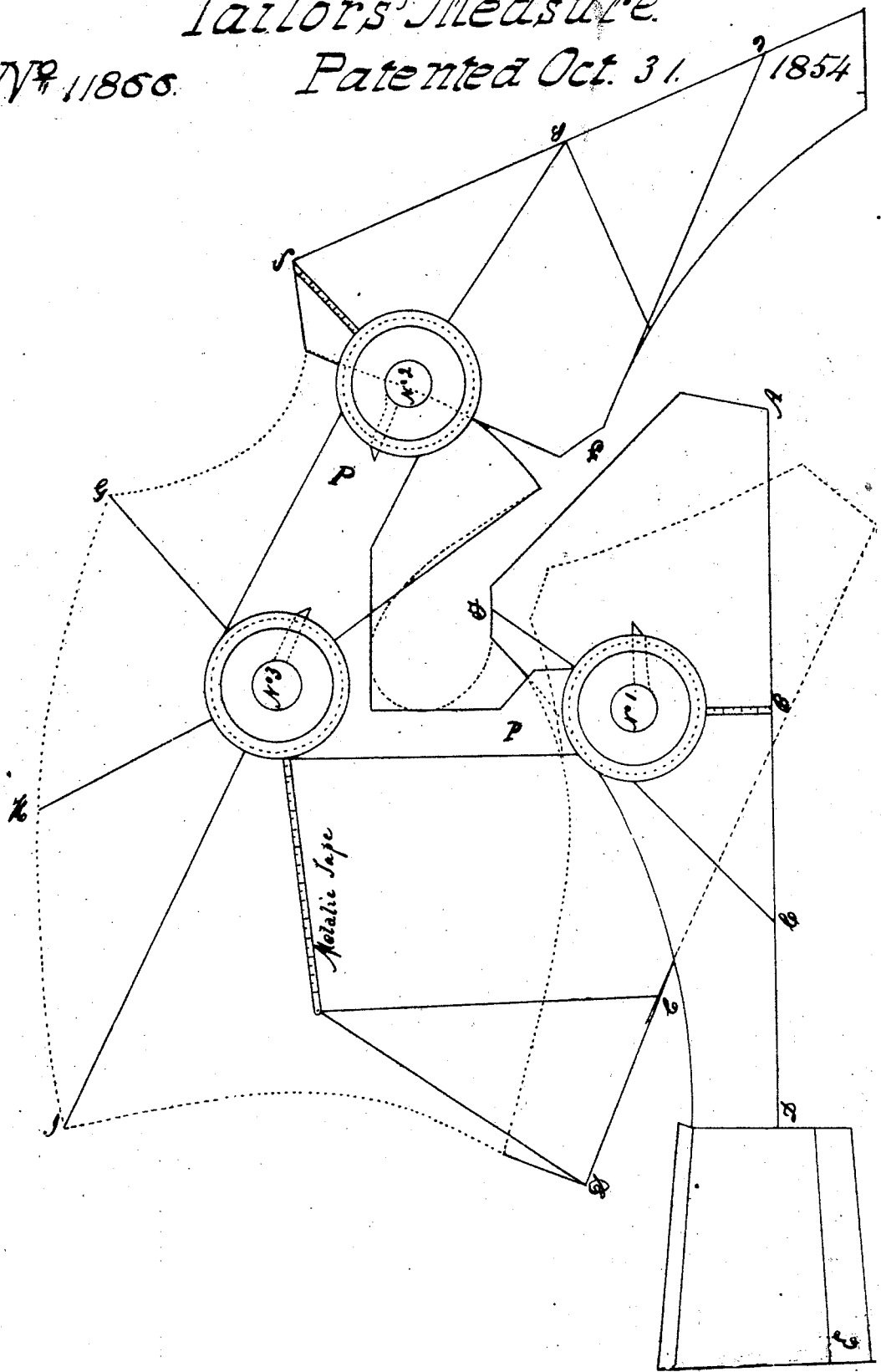

UNITED STATES PATENT OFFICE.

JOHN M. KRIDER, OF NEWTOWN STEPHENSBURG, VIRGINIA.

TAILOR'S MEASURING INSTRUMENT.

Specification of Letters Patent No. 11,866, dated October 31, 1854.

*To all whom it may concern:*

Be it known that I, JOHN M. KRIDER, of Newtown Stephensburg, of the county of Frederick and State of Virginia, have invented a new and useful Instrument for Taking Measures of the Body in Cutting Garments; and I do hereby declare that the following is a full, clear, and exact description of the same, reference being had to the accompanying drawings, making a part of this specification.

I am aware that admeasurements of the body by instruments has been attempted, but in the practical demonstration of cardinal points there has been heretofore a failure, arriving from the fact, that a dependance on judgment in contracting the curved admeasurements, such as that occurring in measuring from the arm pit to the collar and back seam wherein the tape measure necessarily has two directions given the curve, and consequently must be uncertain when laid on the cloth as a plain.

By my invention I have obtained a certainty of securing a fit independent of any exercise of judgment, simply by an application of the instrument to the body and after the several measures are taken from fixed points thereon all the several measures can be transferred to the cloth, and as any line measured over a curved, when flattened will apply to the plain formed of the cloth and as a consequence accuracy of fit must be the result when the same lines occupy the same place on the body that the instrument previously did.

To make use of the instrument, P, P, apply it closely under the left arm pit as seen in the accompanying drawings and secure it with the straps A′ and B′: the protractor T, which is a circle divided into 360 degrees, (or any suitable number) is placed upon one of the studs No. 1: the metal tape S, formed of brass or other flexible material is then directed to the point (F,) the center of the back scye, and as the tape is connected with the protractor it is moved around therewith, and the degree is indicated, and noted by the operator in its line with the fixed pointer or index R; as well as the length upon the tape: next apply the tape to the point B which is a point on the spine horizontal with stud No. 1, noticing as in the first instance the length on the tape and degree on the protractor. Now shift the protractor to stud No. 2 and measure in the same manner, to the top of the back seam at the collar, this is a point (A) and a cardinal one that no other instrument has with certainty established, others having attempted it when their instruments were only adapted to admeasurements of the breast and have therefore failed in this the most essential point of the garment: my instrument being equally adapted to breast and back measurements without unbuckling possesses great advantages over others. With the protractor T, still on stub 2, measured to the point B, noticing the length of line intersecting the horizontal one; now shift the protractor to stub 3, (see Fig. 3) and measure to G, the top of lapel and end of collar; then take the breast measure H, and length of waist J. The tape S, is now to be thrown down until in contact with check 4 and on the stub on end of said tape S is placed the ring of an ordinary tape measure, and with said tape measure take the distance from the stud to the back seam at C, and at D. Now shift the tape ring to stub 3 and measure over the shoulder to F. The length of the back seam viz from A to D is made with the ordinary tape measure.

To transfer these admeasurements to the cloth previously laid on a table, and on which is drawn a straight line for the back seam, on which set off the distance from B to C and C to D from B a line is run out at right angles to B C. The instrument having been unbuckled, is slid on this last line until stud No. 1 indicates the distance from center of the back to said stud: place a weight on the instrument, and then the several measures above taken are laid on the cloth observing to shift the protractor on the stubs as was done in the measuring on the body; in this way every essential point will be clearly set on the cloth.

It may be proper to observe that the long strap used in securing P, P, to the body is carried back of the neck, then down in front and under the right arm to the short strap and buckle, where it will be sufficiently tightened to keep the instrument close to the body, the object being to secure the several stubs without shifting. The base of this instrument P, P, is best made of 2 or 3 thicknesses of morocco, observing to place a small metal angle piece near stub 3, to give firmness at the angle, yet allow flexibility at studs 1 and 2.

I am aware that the use of a protractor or of indicating tapes for measuring the body is not new. But Having described my improvement what I claim as my invention and desire to secure by Letters Patent is—

The use of the protractor T at the point indicated by stud No. 2, for the purpose of determining the cardinal point (A) at the top of the back seam in the manner described.

In testimony whereof I have hereunto signed my name before two subscribing witnesses.

JNO. M. KRIDER.

Witnesses:
  JOHN F. CLARK,
  SAML. GRUBB.